US010462632B2

(12) United States Patent
Artstain et al.

(10) Patent No.: US 10,462,632 B2
(45) Date of Patent: Oct. 29, 2019

(54) POWER MANAGEMENT TECHNIQUES FOR WIRELESSLY-INTERCONNECTED DEVICES

(71) Applicant: INTEL IP CORPORATION, Santa Clara, CA (US)

(72) Inventors: Ofir Artstain, Netanya (IL); Michael Glik, Kfar Saba (IL); Solomon Trainin, Haifa (IL); Kristoffer D. Fleming, Chandler, AZ (US)

(73) Assignee: INTEL IP CORPORATION, Santa Clara, CA (US)

( * ) Notice: Subject to any disclaimer, the term of this patent is extended or adjusted under 35 U.S.C. 154(b) by 166 days.

(21) Appl. No.: 15/283,116

(22) Filed: Sep. 30, 2016

(65) Prior Publication Data
US 2018/0095512 A1    Apr. 5, 2018

(51) Int. Cl.
G06F 1/32         (2019.01)
H04W 4/80         (2018.01)
G06F 1/3206       (2019.01)
G06F 1/3234       (2019.01)

(52) U.S. Cl.
CPC ............ *H04W 4/80* (2018.02); *G06F 1/3206* (2013.01); *G06F 1/3234* (2013.01)

(58) Field of Classification Search
CPC .................... G06F 1/3215; H04W 52/0225
See application file for complete search history.

(56) References Cited

U.S. PATENT DOCUMENTS

| 2007/0053315 | A1 | 3/2007 | Sugaya |
| 2011/0205949 | A1 | 8/2011 | Maenpaa et al. |
| 2013/0210481 | A1 | 8/2013 | Sane |
| 2014/0073302 | A1* | 3/2014 | Trethewey ........ H04W 52/0251 455/418 |
| 2015/0169371 | A1* | 6/2015 | Yarvis ............... G06Q 10/10 718/104 |
| 2015/0181529 | A1* | 6/2015 | Birnbaum ......... H04W 52/0261 370/311 |
| 2016/0081131 | A1 | 3/2016 | Walley et al. |
| 2016/0182291 | A1* | 6/2016 | Verma .................. H04B 7/26 709/221 |
| 2016/0309412 | A1 | 10/2016 | Choi et al. |

OTHER PUBLICATIONS

International Search Report for PCT Patent Application No. PCT/US2017/050359, dated Feb. 7, 2018, 3 pages.

* cited by examiner

*Primary Examiner* — Albert Wang

(57) ABSTRACT

Techniques (e.g., apparatus, method, machine-readable medium, chipset, etc.) to effect scenario analysis. Included is a determining of a power-affecting operational setting based on at least one operating condition of a device, the at least one operating condition of the device to be an operating condition of the device while the device is communicatively coupled to another device; and a setting of a first operational setting of the device based on the determined power-affecting operational setting.

25 Claims, 7 Drawing Sheets

FIG. 11

LOOK-UP TABLE

| | | | Inputs | | | | | | | | | | Outputs | | | |
|---|---|---|---|---|---|---|---|---|---|---|---|---|---|---|---|---|
| | AC/Battery Powered? (AC; Battery) | User Productiv. Level? | Avg BW? | Video Confer. In Session? (Yes; No) | Remote Monitor in use? (Yes; No) | External Keyboard Connect.? (Yes; No) | External Mouse in Connect.? (Yes; No) | Webcam Connect.? (Yes; No) | Audio in Connect.? (Yes; No) | Perform. Preferen. Setting? (AC: Max Batt: Min.) | USB TPT Req.? | USB Bulk BW value? | Frame Skip value? | Watch Mouse Mode? (Yes; No) | Link Sched. Period Setting? | LTR Setting? | Data/Int. to Host Minimum Setting? | Duration Time to Enter Idle? |
| 1 | AC | | | Yes | Yes | Yes | Yes | Yes | Yes | Max | | 200Mbps | 50% | No | 4ms | 70usec | 4ms | <4ms |
| 2 | AC | Avg | Very Low | No | No | No | No | No | No | Max | <10kB | | 97% | No | 4ms | 70usec | 4ms | <4ms |
| 3 | Battery | | Very Low | No | No | No | No | No | No | Balance | <10kB | | | No | 8ms | 300usec | 8ms | <8ms |
| 4 | Battery | | | No | No | No | No | No | No | Balance | | 0 | 50% | Yes | 32ms | Max | 32ms | <32ms |
| 5 | Battery | | | No | No | No | No | Idle | Idle | Batt.Sav. | | | 100% | No | 100ms | N/A | 100ms | <100ms |

POWER MANAGEMENT TECHNIQUES FOR WIRELESSLY-INTERCONNECTED DEVICES

TECHNICAL FIELD

Examples described herein are generally related to power management arrangements with respect to wirelessly-interconnected devices, such as an example mobile device wirelessly docked to a non-mobile device.

BACKGROUND

Computing devices having wireless capabilities may communicatively couple to other devices having wireless capabilities via a wireless local area network (WLAN) using wireless technologies such as Wi-Fi™. Also, wireless technologies designed to operate in a 60 GHz communication band such as WiGig™ may allow wireless capable devices to replace wired interconnects with high speed and relatively short range wireless interconnects via a process typically referred to as wireless coupling and/or docking. The high speed and relatively short range wireless interconnects using wireless technologies such as WiGig may allow devices to wirelessly dock with other devices having displays. In some examples, once wirelessly docked, the device may, as one example, utilize another device's display in a same manner as displays may be used when connected to a wired or physical docking station. Because at least one device of such wirelessly-interconnected devices may often be operational under battery power, and because long battery life is desirable to users, there exists a need for improved power management with respect to wirelessly-interconnected devices, e.g., to increase an efficiency of energy usage, reduce an amount of energy consumed, and/or reduce a cost to operate the electronic device.

BRIEF DESCRIPTION OF THE DRAWINGS

FIG. 11 illustrates an example look-up-table.

DETAILED DESCRIPTION

Figure 1:
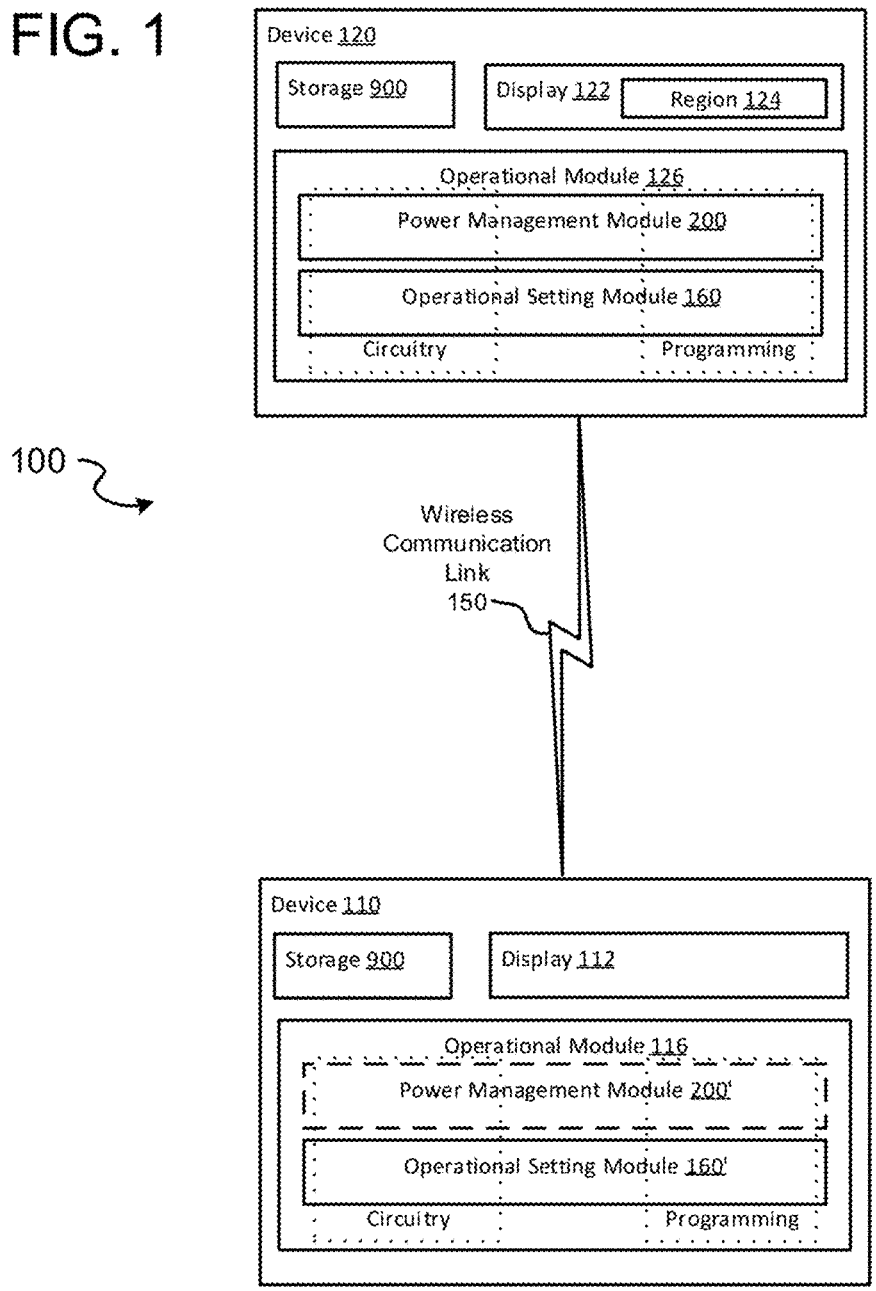
FIG. 1 illustrates an example of a system.

Examples discussed herein are generally directed to improvements for devices to wirelessly couple or wirelessly dock using wireless technologies associated with, for example, Wi-Fi or WiGig. These wireless technologies may include wireless technologies suitable for use with devices or user equipment (UE) or access points deployed in or coupled via a WLAN. For example, wirelessly capable devices or access points for a WLAN may be configured to operate in compliance with various WLAN standards promulgated by the Institute of Electrical and Electronic Engineers (IEEE). These WLAN standards may include Ethernet wireless standards (including progenies and variants) associated with the IEEE Standard for Information technology—Telecommunications and information exchange between systems—Local and metropolitan area networks—Specific requirements Part 11: WLAN Media Access Controller (MAC) and Physical Layer (PHY) Specifications, published March 2012, and/or later versions of this standard ("IEEE 802.11").

In some examples, various IEEE standards associated with IEEE 802.11 such as IEEE 802.11a/g, IEEE 802.11ac or IEEE 802.11ad, may be utilized by wirelessly capable devices or access points to establish or maintain communication links within a WLAN and/or establish wireless communications with each other (e.g., wireless coupling or docking). According to some examples, devices capable of operating in compliance with IEEE 802.11ad and/or using wireless technologies associated with WiGig may include components such as chipsets capable of supporting a WiGig Display Extension (WDE). Using WDE, for example, a device may be able to wirelessly couple or dock to other devices having displays. These other devices having displays may also be capable of supporting WDE and may include, but are not limited to, a monitor, a television, a smartphone, a notebook computer, a tablet computer, an ultrabook computer, a netbook computer, desktop computer with integrated monitor, a handheld gaming device, a gaming console with integrated display, a handheld media player or media player with integrated display.

WiGig coupling and/or docking is a scenario where two devices wirelessly interconnect so as to access various services, such as video and audio streaming, data sharing, access to Internet and storage. Each of the services has BW & latency requirements. However, the WiGig Media Access Control (MAC) is not aware of an actual service or its latency requirement, that is, the MAC only applies pre-defined priorities between data streams.

Accordingly, in order to answer services performance requirements, the MAC will operate with a scheduling scheme which is an aggregation of worst case requirement of BW & latency of all supported services. Thus the MAC would also require the host platform to work at relatively high responsiveness mode, which can result in preventing the host from powering down its resources and reaching deep C-states. Such an approach can result in non-effective host system & device power performance. For the device side, the device performs frequent link accesses which are not utilized with data (this is in order to support latency requirement), and as a result, there is a power penalty of non-required link accesses. In addition, since the link accesses are frequent, idle periods are not long enough to enable the device to get into deep power save between each of link access (i.e., the longer the gap between accesses the deeper the power save level the device can get into). On the platform side, since the reported Local Transaction Request (LTR) is not optimal, the platform wastefully keeps the host interface and platform resources warm at high power even though there is no data transfer.

The present disclosure identifies current WiGig coupling or docking operation states, and manages power saving mechanisms of the platform and MAC to minimize power dissipation on one side, while maintaining the user experience on the other side. In general, the present disclosure provides arrangements to automatically and systematically identify a current scenario in use (such as video streams, the usage of the different USB devices or other system operation conditions). Further, the user may have preferences settings, and operation based on these usage scenarios in conjunction with the preference setting can be considered. In some example embodiments, a platform will autonomously optimize the platform power controls, for example, Latency Tolerance Report (LTR), DID (Device Idle Duration) and configure the device WiGig link access scheme to a minimum operational threshold required to answer performance needs and meet the latency requirements.

FIG. 1 illustrates an example system 100. In some examples, as shown in FIG. 1, system 100 includes a device 110 coupled or docked to device 120 via a wireless communication link 150. Also as shown in FIG. 1, device 120 includes a display 122 including a region 124, an operational module 126 including an operational setting module 160 and a power management module 200, and a storage 900. Dotted blocks show that a portion of the operational module 126, operational setting module 160 and power management module 200 may be implemented as circuitry, programming, or a combination of circuitry and programming. As one non-limiting example, device 120 may be a laptop having a full-sized display for display 122.

Device 110 similarly includes a display 112, an operational module 116 including an operational setting module 160' and a power management module 200', and a storage 900. Dotted blocks again show that a portion of the operational module 116, operational setting module 160' and power management module 200' may be implemented as circuitry, programming, or a combination of circuitry and programming. As one non-limiting example, device 110 may be a user equipment (UE) having a limited-sized display for display 112, such as, for example, a smart phone. As described more below, logic and/or features located at or with device 110 may be capable of wirelessly docking to device 120 to display video content (e.g., on device 120's larger display 122). In some examples, the video content may be destined for a region on display 122 to include region 124.

In some examples, device 110 and display 112 may be arranged to operate according to the one or more wireless network technologies associated with IEEE 802.11 such as IEEE 802.11ad and/or associated with WiGig. For these examples, device 110 may attempt to establish a wireless couple or dock with device 120 via wireless communication link 150. Logic and/or features of device 110 having display 112 or device 120 having display 122, may be capable of supporting a WiGig Display Extension (WDE). For example, use of WDE may enable video content to be transmitted from device 110 to device 120 for display in region 124 of display 122 through the wireless dock established via wireless communication link 150.

According to some examples, the video content destined for presentation or display in region 124 may be associated with various types of productivity applications including, but not limited to, word processing applications, presentation applications, graphic applications or web browsers. Other types of applications may include multimedia applications. Whether multimedia or productivity applications, both types may display a combination of text, graphics, pictures or video that may incorporate both static and non-static video content that may be presented in various regions or an entire region of display 122.

In general, power management module 200 can automatically and systematically identify a current scenario in use (such as video streams, the usage of the different USB devices or other system operation conditions), and analyze the current scenario to autonomously optimize device 120's settings which may affect power consumption thereof.

In general, power management module 200' can automatically and systematically identify a current scenario in use (such as video streams, the usage of the different USB devices or other system operation conditions), and analyze the current scenario to autonomously optimize device 110's settings which may affect power consumption thereof. As discussed elsewhere in this disclosure, the power management module 200' may be optional and may be arranged to cooperate with the power management module 200.

Figure 2:
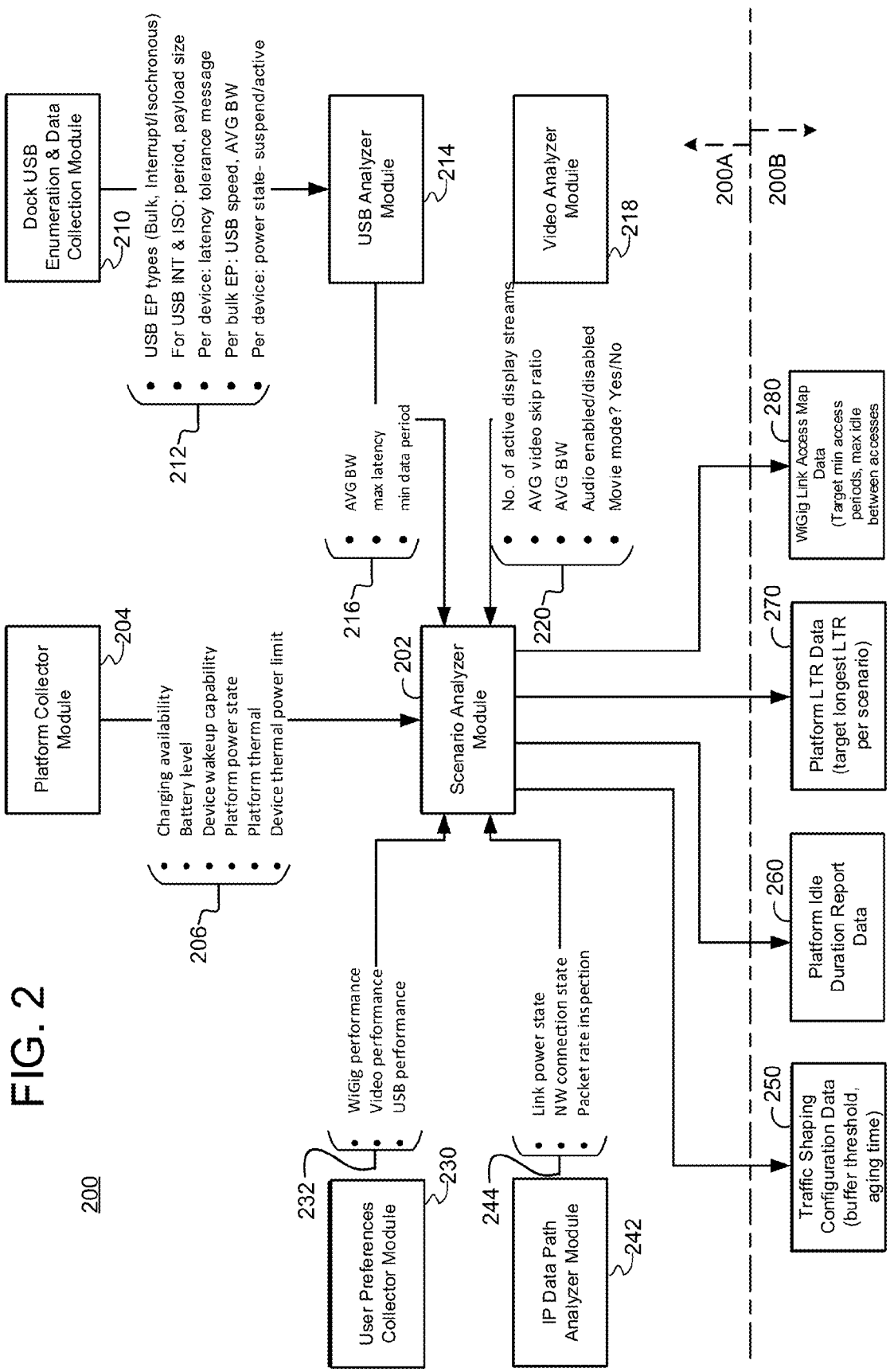
FIG. 2 illustrates an example block diagram for a power management module.

FIG. 2 illustrates an example block diagram for the FIG. 1 power management module 200. Although module 200 shown in FIG. 2 has a limited number of elements in a certain topology or configuration, it may be appreciated that module 200 may include more or less elements in alternate configurations as desired for a given implementation. As one example, the FIG. 1 module 200' provided within the device 110 may contain the same, more, or less elements than the module 200 provided within the device 120. The FIG. 1 module 160' provided within the device 110 may similarly contain the same, more, or less elements than the module 160 provided within the device 120.

The module 200 may have circuitry and/or programming arranged to execute one or more sub-modules or components, and produce one or more output(s).

According to some examples, module 200 may be part of a device (e.g., located at or with a chipset) capable of operating in compliance with one or more wireless technologies such as those described in or associated with the IEEE 802.11 standards. For example, module 200 may be capable of communicatively coupling or wirelessly docking to another device having a display via a wireless communication link or channel established and/or operated according to IEEE 802.11ad and/or WiGig. The examples are not limited in this context.

In some examples, such as FIG. 1, module 200 includes circuitry and programming (as shown in dotted area or block form. Such circuitry and programming may be generally arranged to execute one or more modules (see FIG. 2 examples). Circuitry can include any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Qualcomm® Snapdragon®; Intel® Celeron®, Core (2) Duo®, Core i3, Core i5, Core i7, Itanium®, Pentium®, Xeon®, Atom® and XScale® processors; and similar processors. Other types of multi-core processors and other multi-processor architectures may also be employed as part of the circuitry. According to some examples, circuitry may also include an application specific integrated circuit (ASIC) or a field programmable gate array (FPGA), and modules may be implemented as hardware elements of the ASIC or the FPGA.

Example embodiments herein present a new platform framework which considers WiGig application performance requirements, monitors activity indicators using dedicated "analyzers" and "data collectors". Upon receiving the analyzers & collectors inputs, the framework algorithm outputs the most efficient device link access scheme and platform power management settings. The platform does this dynamically to adjust as conditions change. The framework may be implemented, for example, via any of software, hardcoding (e.g., into the MAC), etc.

In turning to FIG. 2, according to some examples, module 200 may include a scenario analyzer module 202. Scenario analyzer module 202 may be implemented by circuitry and/or programming, to receive input(s) from other modules, process the input(s) so as to arrive at one or more output(s), and to output the same.

The frame work may be based, for example, on following non-exhaustive, non-limiting example data collector and analyzer modules. That is, in some examples, module 200 may also include a platform collector module 204. Such platform collector module 204 may be implemented by circuitry and/or programming, to collect various platform information and to provide such platform information as input(s) to the scenario analyzer module 202. Non-exhaustive and non-limiting examples of platform information include: host platform power configurations and indications such as: charging availability, i.e., AC line connected to battery powered; battery level such as battery charging status; device wakeup capability state such as enabled or disabled; a Power State such as state S0 or connected standby; a platform thermal state and sink thermal sensors reading, such as below, at high water mark, or exceeds limits; and, a device configurable thermal power limit (as set by an original equipment manufacturer (OEM) or platform thermal management framework). FIG. 2's illustrated listing 206 may also list ones of the above information items, and may also list additional information items.

In some examples, module 200 may also include a dock Universal Serial Bus (USB) enumeration and data collection module 210 together with a USB analyzer module 214. Each of such dock USB enumeration and data collection module 210 and USB analyzer module 214 may be implemented by circuitry and/or programming. The dock USB enumeration and data collection module 210 may collect various USB-related information and provide such USB-related information as input(s) to the USB analyzer module 214. Non-exhaustive and non-limiting examples of USB-related information include: USB EP types such as Bulk, Interrupt, or Isochronous; universal serial bus (USB) interrupt (INT) and isochronous (ISO) information such as period, payload size, and Synchronization Type; per device information such as a latency tolerance message; per bulk Endpoint (EP) types such as USB speed, average (AVG) bandwidth (BW), and average interval between transfers; data direction from the endpoint descriptors such as IN or OUT for USB INT, ISO, and BULK; and per device information such as power (D) state such as suspend/active, and Link State (L0, L1, L2). The USB analyzer module 214 preforms one or more predetermined analysis to the USB-related information inputted thereto, to arrive at one or more USB-related output(s), to provide such USB-related output(s) as input(s) to the scenario analyzer module 202. FIG. 2's illustrated listings 212 and 216 may also list ones of the above information items, and may also list additional information items.

In some examples, analyzers may be using two types of data, i.e., data collected from applications, and other data obtained by data packet pattern analysis and data packet deep inspection.

In some examples, module 200 may also include a video analyzer module 218. Such video analyzer module 218 may be implemented by circuitry and/or programming, to collect and/or analyze various video-related information and to provide such video-related information as input(s) to the scenario analyzer module 202. Non-exhaustive and non-limiting examples of video-related information include: No. of active display streams; average (AVG) video skip ratio; AVG skip rows; AVG skip Macro blocks; AVG Encoded BW; Audio enabled/disabled; and Movie mode. FIG. 2's illustrated listing 220 may also list ones of the above information items, and may also list additional information items.

In some examples, module 200 may also include a user preferences collector module 230. Such user preferences collector module 230 may be implemented by circuitry and/or programming, to collect various user preference information and to provide such user preference information as input(s) to the scenario analyzer module 202. Non-exhaustive and non-limiting examples of user preference information include: Power plan configurations set by the user, such as: WiGig performance setting such as performance, balanced or power saver; Video performance setting such as performance, balanced or power saver; USB performance setting such as performance, balanced and power saver. FIG. 2's illustrated listing 232 may also list ones of the above information items, and may also list additional information items.

In some examples, module 200 may also include an Internet Protocol (IP) data path analyzer module 242. Such IP data path analyzer module 242 may be implemented by circuitry and/or programming, to collect various IP data path information and to provide such user preference information as input(s) to the scenario analyzer module 202. Non-exhaustive and non-limiting examples of IP data path information include: Networking Connection State such as Disconnected, Infrastructure (AP) connected, and Peer-to-Peer connected;

Power state for link, such as active or idle, and sleep interval; AVG intra-arrive of packets to determine if any interactive traffic (audio, video conferencing, etc.), background traffic (ftp, file downloads, etc) or if the traffic is bursty (web browsing). FIG. 2's illustrated listing 244 may also list ones of the above information items, and may also list additional information items.

In order to distinguish from the scenario analyzer module 202, collector and analyzer modules supplying inputs to the scenario analyzer module 202 may each be called collectors and pre-analyzers, respectively.

Discussions turn next to non-exhaustive, non-limiting examples of possible outputs of the scenario analyzer module 202. In the FIG. 2 power management module 200 example, outputs from the scenario analyzer module 202 are shown in a lower area 200B shown below the dashed line, whereas collectors and analyzers are shown in an upper area 200A shown above the dashed line.

All the data is collected by the different analyzers/collectors mentioned above. The collected indications and the requirements of the analyzers are aggregated and processed by the scenario analyzer module 202 which may decide on one or more of the following power scheme settings.

More particularly, on a device side, the scenario analyzer module 202 may decide: a Link Access Scheme to set link access frequency. More particularly, per currently-submitted inputs, the algorithm may use the least frequent access pattern that answers scenario performance requirements. For example, low frequent access pattern means less link access performed per time unit, and hence lower device AVG power. In addition, for longer idle durations between link accesses, the device can get into lower power save state between each access for power savings.

On a platform side, the scenario analyzer module 202 may decide:
  a. PCIe Latency Tolerance Report, where an algorithm may select based on the AVG BW and latency indications the highest latency value which can be supported per scenario. The longer the value, the deeper the power save level the platform can get into.
  b. Device Idle Duration, where the algorithm may output an expected idle duration between device accesses to platform host interface and DDR memory.
  c. Traffic shaping, where the algorithm may set a WiGig receive and transmit buffers data aggregation level and data aging before accessing the host memory and PCIe interface. As analyzers requires lower AVG BW and enables longer latency, traffic aggregation can be longer and as a result, a lower number of transactions and lower number of interrupts may be issued by the device towards the host. This shall result in lowering the platform power consumption. The average interval of the receiving network traffic can also be used to determine how long to buffer the data to allow for interactive steams, background downloads, or web browsing usages.

As to FIG. 2 illustrated examples, module 200 may output traffic shaping configuration data 250 which may include results and/or instructions useable for traffic shaping of communications between the coupled wireless devices 120 and 110. The traffic shaping configuration data 250 may be delivered to one or more particular component(s) of the device 120, may be stored in one or more predetermined accessible storage location(s), and/or may be transmitted across the wireless communication link 150 to the other linked device (e.g., device 110). Various components of the device 120 and/or the device 110 may receive and/or access such traffic shaping configuration data 250, and shape (e.g., control) traffic accordingly. Such traffic shaping configuration data 250 may be output in any form, with non-exhaustive, non-limiting examples including direct instructions (e.g., directed to a particular component), packets, data tables, etc. Non-exhaustive and non-limiting examples of traffic shaping configuration data 250 include: buffer threshold; aging time, etc.

In some examples, module 200 may output Platform Idle Duration Report (PIDR) data 260 which may include results and/or instructions useable for determining idle duration information pertaining to the power management module 200. The PIDR data 260 may be delivered to one or more particular component(s) of the device 120, may be stored in one or more predetermined accessible storage location(s), and/or may be transmitted across the wireless communication link 150 to the other linked device (e.g., device 110). Various components of the device 120 and/or the device 110 may receive and/or access such PIDR data 260, and make decisions (e.g., configuration decisions) taking the PIDR data 260 into consideration. Such PIDR data 260 may be output in any form, with non-exhaustive, non-limiting examples including direct instructions (e.g., directed to a particular component), packets, data tables, etc.

Continuing, in some examples, module 200 may output platform Local Transaction Request (LTR) data 270 which may include results and/or instructions to dictate, or to be useable for, LTR decisions of the platform. The LTR data 270 may be delivered to one or more particular component(s) of the device 120, may be stored in one or more predetermined accessible storage location(s), and/or may be transmitted across the wireless communication link 150 to the other linked device (e.g., device 110). Various components of the device 120 and/or the device 110 may receive and/or access such LTR data 270, and effect LTR operations accordingly. Such LTR data 270 may be output in any form, with non-exhaustive, non-limiting examples including direct instructions (e.g., directed to a particular component), packets, data tables, etc. Non-exhaustive and non-limiting examples of LTR data 270 include: targeting a longest LTR per scenario.

Finally, in some examples, module 200 may output WiGig link access map data 280 which may include results and/or instructions useable for link access control. The WiGig link access map data 280 may be delivered to one or more particular component(s) of the device 120, may be stored in one or more predetermined accessible storage location(s), and/or may be transmitted across the wireless communication link 150 to the other linked device (e.g., device 110). Various components of the device 120 and/or the device 110 may receive and/or access such WiGig link access map data 280, and effect link access accordingly. Such WiGig link access map data 280 may be output in any form, with non-exhaustive, non-limiting examples including direct instructions (e.g., directed to a particular component), packets, data tables, etc. Non-exhaustive and non-limiting examples of WiGig link access map data 280 include: targeting minimum access period; maximum idle between accesses, etc.

Regarding the FIG. 1 dashed-block illustrations of device 110's power management module 200', it is noted that the device 110 may include and operate its own power management module, in comparison to the device 120's power management module 200. That is, it is noted that only one or both of the devices 110 and 120 may include a power management module. In the situation where both devices 110 and 120 include a power management module, some mechanism should be provided for cooperation between the multiple power management modules, i.e., a conflict situation where power management modules are making conflicting decisions and/or providing conflicting outputs with respect to a shared coupling or docking, should be avoided for stability of the system. One type of cooperation mechanism might be for the multiple power management modules to exchange and compare decisions and/or outputs across the communication link 150 of the coupling or docking, and that some type of hierarchical priority be in place and implemented in the situation of differing decisions and/or outputs. Another type of cooperation mechanism might be for the multiple power management modules to share responsibilities, i.e., one module performing predetermined decisions and/or outputs, while another module performing other decisions and/or outputs. It is also possible that a portion of the power management module is implemented in one of the coupled or docked devices, while a remaining portion is implemented in the other of the coupled or docked devices.

Figure 3:
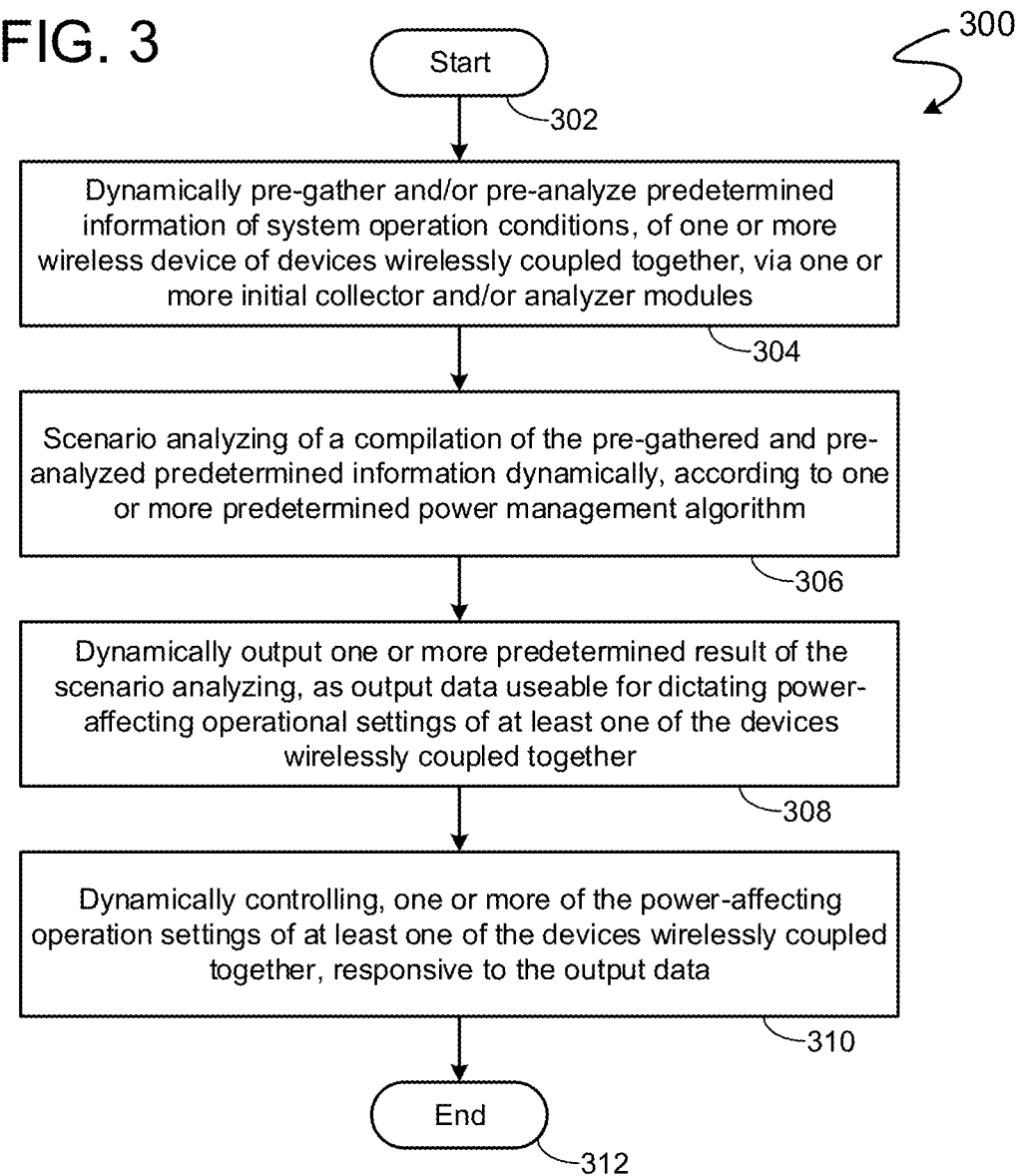
FIG. 3 illustrates an example of a logic flow.

Turning to FIG. 3, such FIG. includes a set of logic flows 300 representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

In further detailing, FIG. 3 illustrates an example of a logic flow 300. Logic flow 300 may be representative of some or all of the operations executed by one or more logic, features, or devices described herein, such as the power management module 200. More particularly, logic flow 300 may be implemented by one or more sub-components of the power management module 200, e.g., the scenario analyzer module 202, platform collector module 204, dock USB enumeration and data collection module 210, USB analyzer module 214, video analyzer module 218, user preferences collector module 230 and IP data path analyzer module 242.

In the illustrated example shown in FIG. 3, after a start 302, logic flow 300 may perform operation(s) 304, to dynamically collect and/or pre-analyze (before a main analysis performed by a scenario analyzer) predetermined information of system operation conditions, of one or more wireless device of devices wirelessly coupled together, via one or more initial collector and/or analyzer modules. In one example, all or fewer of the platform collector module 204, dock USB enumeration and data collection module 210, USB analyzer module 214, video analyzer module 218, user preferences collector module 230 and IP data path analyzer module 242 may collect and/or pre-analyze the predetermined information. Given that an object of the power management module 200 is to improve power efficiency in a line-powered wireless device and/or improve power efficiency and longevity in a battery-powered wireless device, the dynamic collecting and/or pre-analyzing may be performed regularly (e.g., a predefined internals; periodically; etc.) or may be continuously performed in real-time, with a goal to allow regular or real-time dynamic adjustment of power-affecting operational settings of the wireless device. Continuous real-time performance of the operation(s) 304 may itself consume higher power resources, while regular (e.g., predefined internal; periodic; etc.) performance may consume less power resources. In short, more frequent performance may result in higher power consumption, while less frequent performance may result in lower power consumption.

Further, in some examples, the platform collector module 204, dock USB enumeration and data collection module 210, USB analyzer module 214, video analyzer module 218, user preferences collector module 230 and IP data path analyzer module 242 may each perform their collecting and/or pre-analyzing on differing individualized schedules. For example, a subset of such modules/analyzers may collect and/or pre-analyze only responsive to an occurrence event (e.g., power-up of a USB device), another subset may collect and/or pre-analyze regularly (e.g., at regular time intervals), while another subset may collect and/or pre-analyze continuously in real time.

In order to avoided redundantly-provided (i.e., wasteful) inputs, in some examples, the scenario analyzer module 202 may be arranged to assume that information from collectors/pre-analyzers remains the same until updated information is received from the collector/pre-analyzer. According to some examples, buffers and/or storage locations may be provided and preassigned to hold various information obtained from the collectors/pre-analyzers, until a content of the buffer and/or storage locations is overwritten by next incoming information.

In continuing, according to some examples, logic flow 300 may further perform operation(s) 306 to implement scenario analyzing of a compilation of the collected and pre-analyzed predetermined information dynamically, according to one or more predetermined power management algorithm. In one example, the scenario analyzer module 202 may perform scenario analyzing of a compilation of predetermined information from all or fewer of the platform collector module 204, dock USB enumeration and data collection module 210, USB analyzer module 214, video analyzer module 218, user preferences collector module 230 and IP data path analyzer module 242. Given that an object of the power management module 200 is to improve power efficiency in a line-powered wireless device and/or improve power efficiency and longevity in a battery-powered wireless device, the dynamic scenario analyzing may be performed regularly (e.g., a predefined internals; periodically; etc.) or may be performed continuously in real-time, with a goal to allow regular or real-time dynamic adjustment of power-affecting operational settings of the wireless device. Continuous real-time performance of the operation(s) 306 may itself consume more power resources, while regular (e.g., predefined internal; periodic; etc.) performance may consume less power resources. Again, in short, more frequent performance may result in higher power consumption, while less frequent performance may result in lower power consumption.

As an additional feature of note, a degree and/or type of scenario analyzing applied in operation(s) 306 by the scenario analyzer module 202, may vary dynamically over time. In some examples, a first (e.g., less intensive and/or less inclusive) scenario analyzing may be applied during times when the wireless device is line-powered (i.e., power is plentiful), and a second (e.g., more intensive and/or inclusive) scenario analyzing may be applied during times when the wireless device is battery-powered. As further examples, while the second (e.g., more intensive and/or inclusive) scenario analyzing may be applied during times when the wireless device is battery-powered and a residual battery power is above 50%, a third (e.g., even more intense and/or inclusive) scenario analyzing may be applied during times when the residual battery power is at or below 50%. In other examples, in a situation where the collectors and/or pre-analyzers each perform their collecting and/or pre-analyzing on differing individualized schedules, the scenario analyzing may take such individualized schedules into consideration to dynamically adjust (e.g., change the analyzing algorithm applied, at differing times because differing ones of the collected and/or pre-analyzed information inputs are available at differing times).

Next, according to some examples, logic flow 300 may further perform operation(s) 308 to dynamically output one or more predetermined result of the scenario analyzing, as output data useable for dictating power-affecting operational settings of at least one of the devices wirelessly coupled together. In one example, the scenario analyzer module 202 may perform dynamic outputting of all or fewer of the results of the scenario analyzing. Given that an object of the power management module 200 is to improve power efficiency in a line-powered wireless device and/or improve power efficiency and longevity in a battery-powered wireless device, the dynamic outputting may be performed regularly (e.g., a predefined internals; periodically; etc.) or may be performed continuously in real-time, with a goal to allow regular or real-time dynamic adjustment of power-affecting operational settings of the wireless device. Continuous real-time performance of the operation(s) 308 may itself consume more power resources, while regular (e.g., predefined internal; periodic; etc.) performance may consume less power resources. Again, in short, more frequent performance may result in higher power consumption, while less frequent performance may result in lower power consumption.

According to some examples, buffers and/or storage locations may be provided and preassigned to hold various output results from the scenario analyzer module 202, until a content of the buffer and/or storage locations is overwritten by next output results. Such may be beneficial in allowing other device components to access the output results based upon their own timing or own schedules.

Finally, according to some examples, operation(s) 310 may be performed (e.g., by the scenario analyzer module 202 and/or other components of the wirelessly-interconnected device 120) to dynamically control, one or more of the power-affecting operation settings of at least one of the devices wirelessly coupled together, responsive to the output data. In some examples, differing components may control (e.g., change) differing power-affecting operation settings of at least one of the devices, at differing timings (e.g., based upon their own timing (e.g., interrupts) or own schedules). Further, in some examples, differing components may respond to and/or utilize differing ones of output results. Given that an object of the power management module 200 is to improve power efficiency in a line-powered wireless device and/or improve power efficiency and longevity in a battery-powered wireless device, the controlling may be performed regularly (e.g., a predefined internals; periodically; etc.) or may be performed continuously in real-time, with a goal to allow regular or real-time dynamic adjustment of power-affecting operational settings of the wireless device. Continuous real-time performance of the operation(s) 310 may itself consume more power resources, while regular (e.g., predefined internal; periodic; etc.) performance may consume less power resources. Again, in short, more frequent performance may result in higher power consumption, while less frequent performance may result in lower power consumption.

Execution of the FIG. 3 flow 300 terminates at an end 312.

Discussions turn next to several non-exhaustive, non-limiting specific examples which may assist in a further understanding of example operations of the power management module 200. More specifically, the following examples are assumed to be for a same wirelessly-interconnected device, and are assumed to be a series of changing scenarios (iterations) occurring for the same device over time. Further, input information collected and/or pre-analyzed over time is assumed to remain the same from example scenario to a next example scenario unless indicated otherwise. For example, if input information indicated that the device was AC powered, then it is assumed with following iterations of input information that the device remains AC powered, unless the input information for a particular iteration indicates a change.

Figure 4:
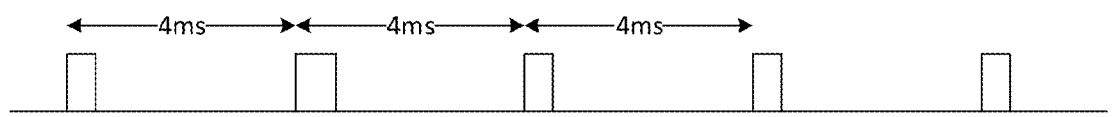
FIGS. 4-8 illustrate example timing diagrams of a system.

In one example scenario description, collecting and/or pre-analyzing operations of ones of the collectors/pre-analyzers (i.e., the platform collector module 204, dock USB enumeration and data collection module 210, USB analyzer module 214, video analyzer module 218, user preferences collector module 230 and IP data path analyzer module 242) may result in the following predetermined information for input into the scenario analyzer module 202: the device is currently AC powered (i.e., power line-connected); docking scenario collections indicated that video conferencing in use, an external WiGig monitor in use, and a USB mouse, keyboard, audio and webcam are currently connected to the dock; user preferences are set for maximum performance when the device is AC powered; and, a USB bulk bandwidth (BW) equals 200 Mbps, and a frame skip is 50%. Responsive to input of such information, the scenario analyzer module 202 algorithm may output the following for power management: a link scheduling period is set to 4 ms; Local Transaction Request (LTR) is set according to a receive buffer and a USB BW requirement (e.g., 70 usec for med-high BW); for traffic shaping, data and interrupt to the host minimum is set to a 4 ms period; and, for an idle duration, a time from a link entering idle to a next active period <4 ms. A timing diagram associated with this scenario iteration may be as illustrated in FIG. 4.

Figure 5:
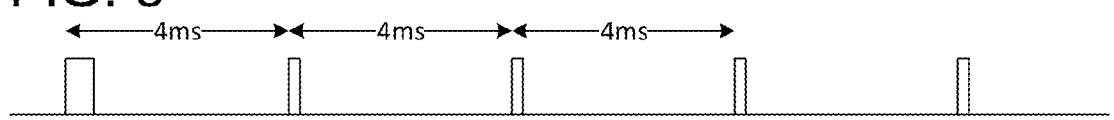

In a next example scenario iteration for the device, collecting and/or pre-analyzing operations of ones of the collectors/pre-analyzers may result in the following additional and/or updated predetermined information for input into the scenario analyzer module 202: a conference call has ended; typical user productivity indicated; video frame skip ration is 97%; USB webcam is off; a USB TPT requirement is low (<10 KB sec); user performance control is set to high when running on AC power; and average (AVG) BW is very low. Responsive to input of such information, the scenario analyzer module 202 algorithm may output the following for power management: link scheduling is set to 4 ms; Local Transaction Request (LTR) is set according to a receive buffer and a USB BW requirement (e.g., 70 usec for med-high BW); for traffic shaping, data and interrupt to the host minimum is set to a 4 ms period; and, for an idle duration, a time from a link entering idle to a next active period <4 ms. That is, since user preferences are set to high performance when AC powered, the link scheduling remains at high frequency keeping low latency. However, AVR BW is very low, and therefore LTR can be set to a longer value and enable deeper platform power saving. A timing diagram associated with this scenario iteration may be as illustrated in FIG. 5.

Figure 6:
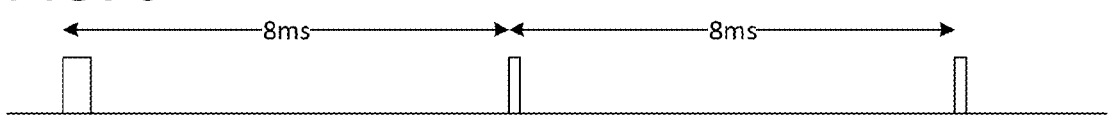

In a next example scenario iteration, further changes have occurred in that the device user has borrowed his/her AC charger to a visitor, and thus has disconnected the device from AC power line connection while continuing with typical productivity. For this example scenario iteration, collecting and/or pre-analyzing operations of ones of the collectors/pre-analyzers may result in the following additional and/or updated predetermined information for input into the scenario analyzer module 202: device running on battery power; video frame skip ration is 97%; USB webcam is off; a USB TPT requirement is low (<10 KB sec); and user performance control is set to "balanced" when running on AC power. Responsive to input of such information, the scenario analyzer module 202 algorithm may output the following for power management: link scheduling is set to 8 ms; LTR is set according to a receive buffer and a USB BW requirement (e.g., 300 usec for low BW); for traffic shaping, data and interrupt to the host minimum is set to a 8 ms period; and, for an idle duration, a time from a link entering idle to a next active period <8 ms. That is, since user preferences are set to "balanced" while running on battery, the video latency is set for longer, and as a result, the link scheduling is being updated for 8 ms. Further, the traffic shaping and idle duration are updated for a longer period. LTR remains the same as in the previous iteration since a BW requirement has remained the same. A timing diagram associated with this scenario iteration may be as illustrated in FIG. 6.

Figure 7:
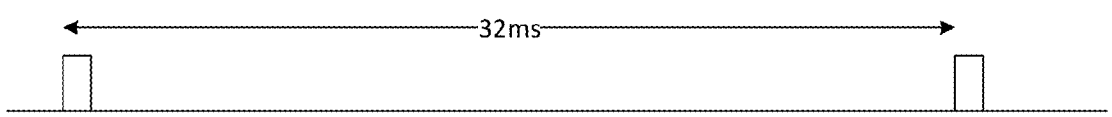

In a next example scenario iteration, the device user has connected to WiGig TV playing a movie, while the device continues to run on battery power. For this example scenario iteration, collecting and/or pre-analyzing operations of ones of the collectors/pre-analyzers may result in the following additional and/or updated predetermined information for input into the scenario analyzer module 202: device running on battery power; video frame skip ration is 50% (since the movie is 30 fps); a movie mode indication is Yes; no USB devices currently connected; and user performance control is set to "balanced" when running on AC power. Responsive to input of such information, the scenario analyzer module 202 algorithm may output the following for power management: link scheduling is set to 32 ms; LTR is set according to a receive buffer and a USB BW requirement (e.g., 3 msec for zero BW); for traffic shaping, data and interrupt to the host minimum is set to a 32 ms period; and, for an idle duration, a time from a link entering idle to a next active period <32 ms. That is, since there are no USB devices connected, there are no USB BW/latency requirement. A BW requirement in a client to TV (Tx) direction only, so no BW requirement on the device receive buffer. Since the movie and frame rate is 30 fps, link scheduling is tuned to 32 ms, and LTR is set to a max. A timing diagram associated with this scenario iteration may be as illustrated in FIG. 7.

Figure 8:
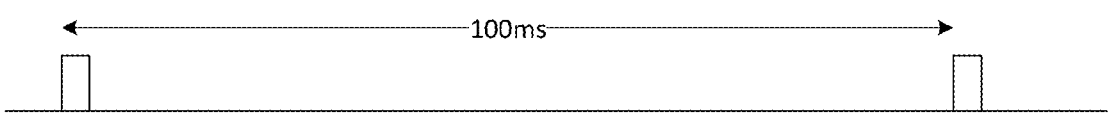

As a final example scenario iteration, the device is running on the AC changer (i.e., connected to a WiGig infrastructure network and a WiGig dock is productive with a screen image idle for an extended time. Further, USB devices (e.g., mouse and keyboard) are idle for an extended time. This is also the case for Modern Standby in which the screen would also be off. For this final scenario iteration, collecting and/or pre-analyzing operations of ones of the collectors/pre-analyzers may result in the following additional and/or updated predetermined information for input into the scenario analyzer module 202: video frame skip ration is 100% (since the screen image is idle); USB devices are connected but are idle; and user performance control is set to "battery save mode" when running on battery. Responsive to input of such information, the scenario analyzer module 202 algorithm may output the following for power management: link scheduling is set to 100 ms; LTR is set according to a receive buffer and USB is idle (no requirement); for traffic shaping, data and interrupt to the host minimum is set to a 100 ms period; and, for an idle duration, a time from a link entering idle to a next active period <100 ms. That is, since the USB devices are idle for an extended time and therefor USB BW/latency requirement can be relaxed slightly. Since the video and input/output (IO) traffic is idle, then only the infrastructure networking will need to be polled periodically. Based on the networking active being also a low rate and only incoming networking events are active then, the link scheduling is tuned to 100 ms, and LTR is set to a max (no requirement). To save power, this scenario will have a delay of average 50 ms (and up to ~100 ms) when the user moves the mouse or presses a key, but this mode is only entered after a prolong idle case in 50 or in Modern Standby, and such delay will not be very noticeable to the user. A timing diagram associated with this scenario iteration may be as illustrated in FIG. 8.

In visually comparing the timing diagrams of the FIGS. 4-7 scenario iterations for the device over time, it can be seen that as a result of the present example architecture's operations, a number of accesses implemented by the device have dynamically become fewer and less often over time, resulting in the ability of the device to avoid wasteful excessive accesses and to more deeply power down between accesses. Such results in significantly improved power efficiency and prolonged battery-powered life for the device.

FIG. 11 is an example look-up-table (LUT) which may be used as one type of analyzing algorithm for scenario analyzing of collected and pre-analyzed information (i.e., a compilation of current operational details of the apparatus), and in deciding on appropriate outputs. That is, one or more LUT may have a plurality of columns listing a plurality of input information (e.g., operational items) which are being considered. For example, whether the apparatus is currently AC-line powered or battery powered, whether the apparatus is currently set to a watch movie mode, etc. Further, the LUT may have a plurality of columns listing a plurality of output information (e.g., operational settings) which may be outputted. For example, a link schedule period setting, an LTR setting, etc. Rows of the LUT may then contain differing combinations of values for the input information items, as well as corresponding output information values which have been pre-decided to be outputted for the differing input information combinations. The scenario analyzer may be programmed and/or hard encoded to utilize current input information to match to a most appropriate row in the LUT, and then to output the output information (e.g., operational settings) provided by that most appropriate row. The example FIG. 11 LUT arrangement (including example listed inputs and outputs) is by no means exhaustive or limiting, i.e., any type of LUT arrangement (e.g., including more, less or differing inputs and outputs) may be used.

In other examples, an algorithm used may be mathematical. For example, if a subject input value is within a range of W to X, then output value P for an operational setting for L, whereas if the input value is within a range of Y to Z, then output value Q for an operational setting for L. Logical algorithms (e.g., "If R and S=Yes, then V) may also be used in other examples.

In other examples, differing types of algorithms may be concurrently used within a same scenario analyzing session. For example, a LUT may be used with respect to a first subset of inputs to determine a first subset of outputs, whereas a mathematical formula may be used with respect to a second subset of inputs to determine a second subset of outputs.

Figure 9:
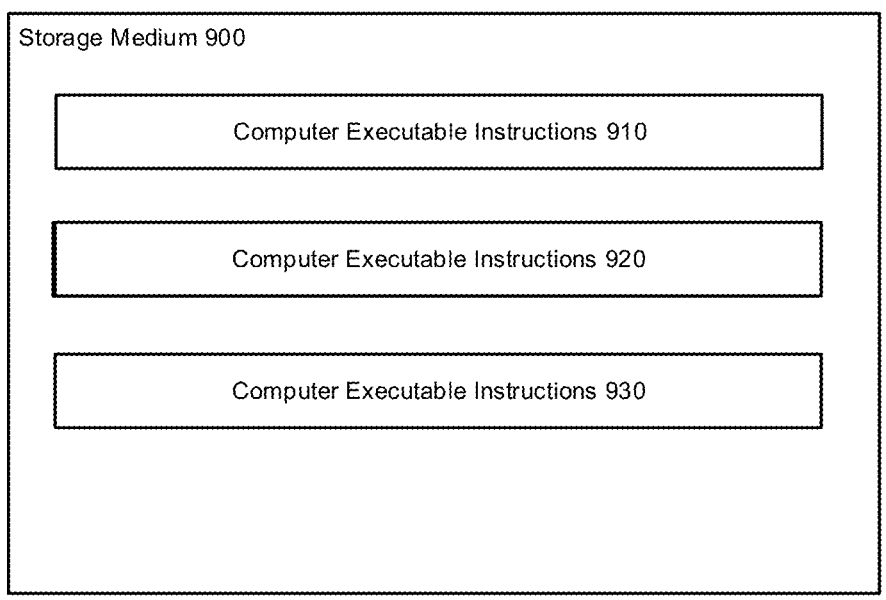
FIG. 9 illustrates an example of a storage medium.

In continuing discussions, FIG. 9 illustrates an embodiment of a storage medium arrangement. As shown in FIG. 9, the storage medium arrangement includes a storage medium 900. Storage medium 900 may include an article of manufacture. In some examples, storage medium 900 may include any non-transitory computer readable medium or machine readable medium, such as an optical, magnetic or semiconductor storage. Storage medium 900 may store various types of computer executable instructions, such as instructions 910 to implement logic flow 300 and other instructions 920, 930 to implement operations implemented by the device. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 10:
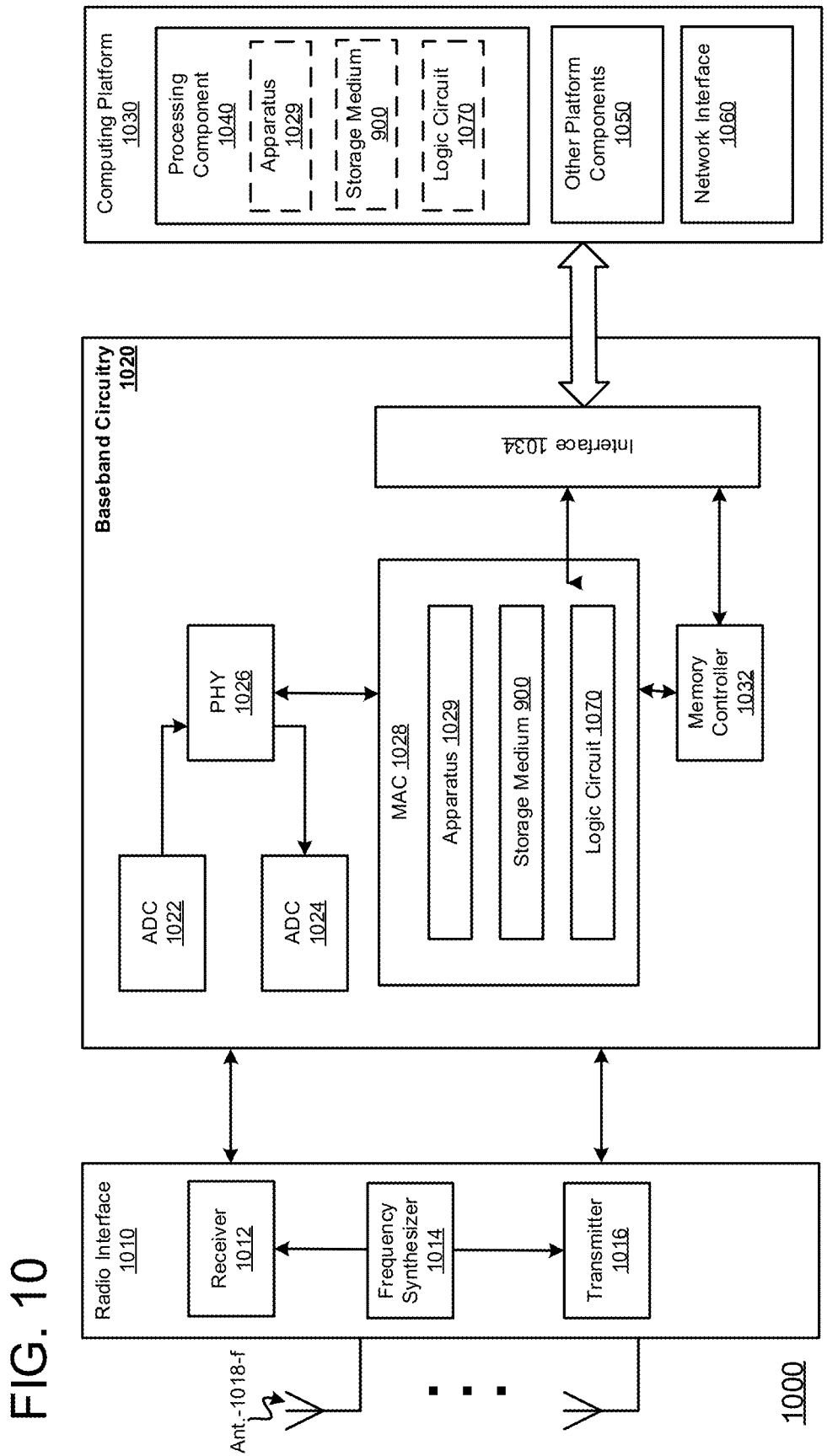
FIG. 10 illustrates an example device.

FIG. 10 illustrates an embodiment of a device 1000 which may be an implementation of the FIG. 1 device 110 and/or 120. In some examples, device 1000 may be configured or arranged for wireless communications to wirelessly couple or dock to one or more other devices having a display to display or present video content. Device 1000 may include components which implement, for example, module 200, storage medium 900 and/or a logic circuit 1070. The logic circuit 1070 may include physical circuits to perform operations described for module 200. As shown in FIG. 10, device 1000 may include a radio interface 1010, baseband circuitry 1020, and computing platform 1030, although examples are not limited to this configuration.

The device 1000 may implement some or all of the structure and/or operations for module 200, storage medium 900 and/or logic circuit 1070 in a single computing entity, such as entirely within a single device. The embodiments are not limited in this context.

In one example, radio interface 1010 may include a component or combination of components adapted for transmitting and/or receiving single carrier or multi-carrier modulated signals (e.g., including complementary code keying (CCK) and/or orthogonal frequency division multiplexing (OFDM) symbols and/or single carrier frequency division multiplexing (SC-FDM symbols) although the embodiments are not limited to any specific over-the-air interface or modulation scheme. Radio interface 1010 may include, for example, a receiver 1012, a transmitter 1016 and/or a frequency synthesizer 1014. Radio interface 1010 may include bias controls, a crystal oscillator and/or one or more antennas 1018-*f*. In another embodiment, radio interface 1010 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1020 may communicate with radio interface 1010 to process receive and/or transmit signals and may include, for example, an analog-to-digital converter 1022 for down converting received signals, a digital-to-analog converter 1024 for up converting signals for transmission. Further, baseband circuitry 1020 may include a baseband or physical layer (PHY) processing circuit 1026 for PHY link layer processing of respective receive/transmit signals. Baseband circuitry 1020 may include, for example, a processing circuit 1028 for medium access control (MAC)/data link layer processing. Baseband circuitry 1020 may include a memory controller 1032 for communicating with MAC processing circuit 1028 and/or a computing platform 1030, for example, via one or more interfaces 1034. The MAC processing circuit 1020 may include an apparatus 1029, storage medium 900 and logic circuit 1070.

In some embodiments, PHY processing circuit 1026 may include a frame construction and/or detection module, in combination with additional circuitry such as a buffer memory, to construct and/or deconstruct communication frames (e.g., containing subframes). Alternatively or in addition, MAC processing circuit 1028 may share processing for certain of these functions or perform these processes independent of PHY processing circuit 1026. In some embodiments, MAC and PHY processing may be integrated into a single circuit.

Computing platform 1030 may provide computing functionality for device 1000. As shown, computing platform 1030 may include a processing component 1040. In addition to, or alternatively of, baseband circuitry 1020 of device 1000 may execute processing operations or logic for module 200, storage medium 900, logic circuit 1070 and any other apparatus 1029 using the processing component 1030. Processing component 1040 (and/or PHY 1026 and/or MAC 1028) may include various hardware elements, software elements, or a combination of both. Examples of hardware elements may include devices, logic devices, components, processors, microprocessors, circuits, processor circuits (e.g., processor circuit 1020), circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

Computing platform 1030 may further include other platform components 1050. Other platform components 1050 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Computing platform 1030 may further include a network interface 1060. In some examples, network interface 1060 may include logic and/or features to support network interfaces operated in compliance with one or more wireless broadband technologies such as those described in one or more standards associated with IEEE 802.11 and/or WiGig.

Device 1000 may be, for example, user equipment, a computer, a personal computer (PC), a desktop computer, a laptop computer, an ultrabook computer, a smartphone, a tablet computer, a notebook computer, a netbook computer, a tablet, a smart phone, embedded electronics, a gaming console, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of device 1000 described herein, may be included or omitted in various embodiments of device 1000, as suitably desired. In some embodiments, device 1000 may be configured to be compatible with protocols and frequencies associated with IEEE 802.11 Standards for WLANs and/or wireless docking technologies or standards such as WiGig, although the examples are not limited in this respect.

Embodiments of device 1000 may be implemented using single input single output (SISO) architectures. However, certain implementations may include multiple antennas (e.g., antennas 1018-*f*) for transmission and/or reception using adaptive antenna techniques for beamforming or spatial division multiple access (SDMA) and/or using multiple input multiple output (MIMO) communication techniques.

The components and features of device 1000 may be implemented using any combination of discrete circuitry, ASICs, logic gates and/or single chip architectures. Further, the features of device 1000 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1000 shown in the block diagram of FIG. 10 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments. Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

As may or may not have been mentioned previously, various features, operations, etc. of this invention may be practiced "simultaneously", "concurrently" or "parallelly". As used within a content of this invention, the term 'simultaneous' means that two things (e.g., collecting; analyzing, etc., of differing information) happen at the same time (i.e., at least partially occur or overlap in time), while the term 'concurrent' means that the two things may occur during the same period of time, but do not necessarily happen at the same time. Concurrent is the broader term, and may include instances of things occurring simultaneously. If two things (e.g., collecting; analyzing, etc., of differing information) overlap in time partially but not completely, the things may be described as occurring concurrently, while the overlapping portion may be described as occurring simultaneously. Further, the term "parallel" means that two things occur along two differing paths or via differing operations. Parallel may include instances which occur simultaneously, instances which occur concurrently, and/or instances occurring at wholly differing time periods.

Some examples may be described using the expression "coupled", "connected", or "capable of being coupled" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

An example 1 concerning an apparatus comprising: circuitry; a scenario analyzer for execution by the circuitry, the scenario analyzer to determine a power-affecting operational setting based on at least one operating condition of a device, the at least one operating condition of the device to comprise an operating condition of the device when communicatively coupled to another device; and an operational setting module for execution by the circuitry, the operational setting module to set a first operational setting of the device based on the determined power-affecting operational setting.

An example 2 concerning the apparatus of example 1, comprising: at least one collector module for execution by the circuitry, the at least one collector module to dynamically collect the at least one operating condition of the device when communicatively coupled to the another device, and to provide the at least one operating condition to the scenario analyzer.

An example 3 concerning the apparatus of any one of examples 1-2, comprising: at least one analyzer module for execution by the circuitry, to dynamically collect and analyze the at least one operating condition of the device when communicatively coupled to the another device, and to provide an analysis result of the at least one operating condition to the scenario analyzer.

An example 4 concerning the apparatus of any one of examples 1-3, wherein the scenario analyzer is to determine the power-affecting operational setting based on plural operating conditions of the device, the plural operating conditions of the device to each be an operating condition of the device when communicatively coupled to the another device.

An example 5 concerning the apparatus of any one of examples 1-4, wherein the scenario analyzer is to determine the power-affecting operational setting based on plural differing types of operating conditions of the device, the plural differing types of operating conditions of the device to each be an operating condition of the device when communicatively coupled to the another device.

An example 6 concerning the apparatus of any one of examples 1-5, comprising: plural operating collector modules, for execution by the circuitry, the plural operating collector modules to dynamically collect the plural differing types of operating conditions, respectively, when communicatively coupled to the another device, and to provide the plural differing types of operating conditions to the scenario analyzer.

An example 7 concerning the apparatus of example of any one of examples 1-6, comprising: plural analyzer modules, for execution by the circuitry, the plural analyzer modules to dynamically collect and analyze the plural differing types of operating conditions, respectively, when communicatively coupled to the another device, and to provide analysis results of the plural differing types of operating conditions to the scenario analyzer.

An example 8 concerning the apparatus of any one of examples 1-7, wherein the scenario analyzer to determine the power-affecting operational setting based on plural differing types of operating conditions of the device, the plural differing types of operating conditions being obtained concurrently during a same operating condition collecting session, and each being an operating condition of the device when communicatively coupled to the another device.

An example 9 concerning the apparatus of any one of examples 1-8, wherein the plural differing types of operating conditions are ones selected from a list of types including: platform state information; Universal Serial Bus (USB) state information; video state information; user preference state information; and Internet Protocol (IP) data path state information.

An example 10 concerning the apparatus of any one of examples 1-9, comprising the circuitry being provided via a chipset within the device, the chipset to enable the device to wirelessly couple or dock to another device.

An example 11 concerning the apparatus of any one of examples 1-10, comprising the chipset to operate in compliance with at least one or more wireless communication standards associated with the Institute of Electrical and Electronic Engineers (IEEE) 802.11 standards to include IEEE 802.11ad, the chipset further implementing the scenario analyzer.

An example 12 concerning a computer-implemented scenario analysis method for an apparatus, comprising: determining a power-affecting operational setting based on at least one operating condition of a device, the at least one operating condition of the device to comprise an operating condition of the device when communicatively coupled to another device; and setting a first operational setting of the device based on the determined power-affecting operational setting.

An example 13 concerning the method of example 12, comprising: dynamically collecting the at least one operating condition of the device via at least one collector module, when communicatively coupled to the another device, and providing the at least one operating condition to the determining operation.

An example 14 concerning the method of any one of examples 12-13, comprising: dynamically collecting and analyzing the at least one operating condition of the device via at least one analyzer module, when communicatively coupled to the another device, and to provide an analysis result of the at least one operating condition to the determining operation.

An example 15 concerning the method of any one of examples 12-14, wherein the determining more specifically determines the power-affecting operational setting based on plural operating conditions of the device, the plural operating conditions of the device to each be an operating condition of the device when communicatively coupled to the another device.

An example 16 concerning the method of any one of examples 12-15, wherein the determining more specifically determines the power-affecting operational setting based on plural differing types of operating conditions of the device, the plural differing types of operating conditions of the device to each be an operating condition of the device when communicatively coupled to the another device.

An example 17 concerning the method of any one of examples 12-16, comprising: dynamically collecting the plural differing types of operating conditions via plural operating collector modules, respectively, when communicatively coupled to the another device, and to provide the plural differing types of operating conditions to the determining operation.

An example 18 concerning the method of any one of examples 12-17, comprising: dynamically collecting and analyzing the plural differing types of operating conditions via plural analyzer modules, respectively, when communicatively coupled to the another device, and to provide analysis results of the plural differing types of operating conditions to the determining operation.

An example 19 concerning the method of any one of examples 12-18, wherein the determining determines the power-affecting operational setting based on plural differing types of operating conditions of the device, the plural differing types of operating conditions being obtained concurrently during a same operating condition collecting session, and each being an operating condition of the device when communicatively coupled to the another device.

An example 20 concerning the method of any one of examples 12-19, wherein the plural differing types of operating conditions are ones selected from a list of types including: platform state information; Universal Serial Bus (USB) state information; video state information; user preference state information; and Internet Protocol (IP) data path state information.

An example 21 concerning at least one non-transitory machine readable medium comprising a plurality of instructions that in response to being executed on a system maintained at an apparatus cause the system to implement a scenario analysis to: determine a power-affecting operational setting based on at least one operating condition of a device, the at least one operating condition of the device to comprise an operating condition of the device when communicatively coupled to another device; and set a first operational setting of the device based on the determined power-affecting operational setting.

An example 22 concerning the medium of example 21, comprising the instructions to also cause the system to: dynamically collect the at least one operating condition of the device via at least one collector module, when communicatively coupled to the another device, and providing the at least one operating condition to the determine operation.

An example 23 concerning the medium of any one of examples 21-22, comprising the instructions to also cause the system to: dynamically collect and analyze the at least one operating condition of the device via at least one analyzer module, when communicatively coupled to the another device, and to provide an analysis result of the at least one operating condition to the determine operation.

An example 24 concerning the medium of any one of examples 21-23, wherein the determine operation more specifically determines the power-affecting operational setting based on plural operating conditions of the device, the plural operating conditions of the device to each be an operating condition of the device when communicatively coupled to the another device.

An example 25 concerning the medium of any one of examples 21-24, wherein the determine operation more specifically determines the power-affecting operational setting based on plural differing types of operating conditions of the device, the plural differing types of operating conditions of the device to each be an operating condition of the device when communicatively coupled to the another device.

An example 26 concerning the medium of any one of examples 21-25, comprising the instructions to also cause the system to: dynamically collect the plural differing types of operating conditions via plural operating collector modules, respectively, when communicatively coupled to the another device, and to provide the plural differing types of operating conditions to the determine operation.

An example 27 concerning the medium of any one of examples 21-26, comprising the instructions to also cause the system to: dynamically collect and analyze the plural differing types of operating conditions via plural analyzer modules, respectively, when communicatively coupled to the another device, and to provide analysis results of the plural differing types of operating conditions to the determine operation.

An example 28 concerning the medium of any one of examples 21-27, wherein the determine operation determines the power-affecting operational setting based on plural differing types of operating conditions of the device, the plural differing types of operating conditions being obtained concurrently during a same operating condition collecting session, and each being an operating condition of the device when communicatively coupled to the another device.

An example 29 concerning the medium of any one of examples 21-28, wherein the plural differing types of operating conditions are ones selected from a list of types including: platform state information; Universal Serial Bus (USB) state information; video state information; user preference state information; and Internet Protocol (IP) data path state information.

An example 30 concerning a chipset comprising: circuitry; a scenario analyzer for execution by the circuitry, the scenario analyzer to determine a power-affecting operational setting based on at least one operating condition of a device, the at least one operating condition of the device to comprise an operating condition of the device when communicatively coupled to another device; and an operational setting module for execution by the circuitry, the operational setting module to set a first operational setting of the device based on the determined power-affecting operational setting.

An example 31 concerning the chipset of example 30, comprising: at least one collector module for execution by the circuitry, the at least one collector module to dynamically collect the at least one operating condition of the device when communicatively coupled to the another device, and to provide the at least one operating condition to the scenario analyzer.

An example 32 concerning the chipset of any one of examples 30-31, comprising: at least one analyzer module for execution by the circuitry, the at least one analyzer module to dynamically collect and analyze the at least one operating condition of the device when communicatively coupled to the another device, and to provide an analysis result of the at least one operating condition to the scenario analyzer.

An example 33 concerning the chipset of any one of examples 30-32, wherein the scenario analyzer is to determine the power-affecting operational setting based on plural operating conditions of the device, the plural operating conditions of the device to each be an operating condition of the device when communicatively coupled to the another device.

An example 34 concerning the chipset of any one of examples 30-33, wherein the scenario analyzer is to determine the power-affecting operational setting based on plural differing types of operating conditions of the device, the plural differing types of operating conditions of the device to each be an operating condition of the device when communicatively coupled to the another device.

An example 35 concerning the chipset of any one of examples 30-34, comprising: plural operating collector modules, for execution by the circuitry, to dynamically collect the plural differing types of operating conditions, respectively, when communicatively coupled to the another device, and to provide the plural differing types of operating conditions to the scenario analyzer.

An example 36 concerning the chipset of any one of examples 30-35, comprising: plural analyzer modules, for execution by the circuitry, the plural analyzer modules to dynamically collect and analyze the plural differing types of operating conditions, respectively, when communicatively coupled to the another device, and to provide analysis results of the plural differing types of operating conditions to the scenario analyzer.

An example 37 concerning the chipset of any one of examples 30-36, wherein the scenario analyzer to determine the power-affecting operational setting based on plural differing types of operating conditions of the device, the plural differing types of operating conditions being obtained concurrently during a same operating condition collecting session, and each being an operating condition of the device when communicatively coupled to the another device.

An example 38 concerning the chipset of any one of examples 30-37, wherein the plural differing types of operating conditions are ones selected from a list of types including: platform state information; Universal Serial Bus (USB) state information; video state information; user preference state information; and Internet Protocol (IP) data path state information.

An example 39 concerning the chipset of any one of examples 30-38, wherein the chipset to enable the device to wirelessly couple or dock to another device, and to operate in compliance with at least one or more wireless communication standards associated with the Institute of Electrical and Electronic Engineers (IEEE) 802.11 standards to include IEEE 802.11ad, the chipset further implementing the scenario analyzer.

An example 40 concerning the apparatus of any one of examples 1-11, wherein the scenario analyzer to determine the power-affecting operational setting based on plural differing types of operating conditions of the device, the plural differing types of operating conditions being obtained simultaneously during a same operating condition collecting session, and each being an operating condition of the device when communicatively coupled to the another device.

An example 41 concerning the apparatus of any one of examples 1-11, wherein the scenario analyzer to determine the power-affecting operational setting based on plural differing types of operating conditions of the device, the plural differing types of operating conditions being obtained in parallel during a same operating condition collecting session, and each being an operating condition of the device when communicatively coupled to the another device.

An example 42 concerning the apparatus of any one of examples 1-11 and 40-41, wherein the device is communicatively coupled to the another device via one of: WiFi, WiGig, IEEE 802.11a/g, IEEE 802.11ac or IEEE 802.11ad.

An example 43 concerning the apparatus of any one of examples 1-11 and 40-42, wherein the apparatus is one of: user equipment, a computer, a personal computer (PC), a desktop computer, a laptop computer, an ultrabook computer, a smartphone, a tablet computer, a notebook computer, a netbook computer, a tablet, a smart phone, embedded electronics, a gaming console, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof.

An example 44 concerning the apparatus of any one of examples 1-11 and 40-42, wherein the circuitry is at least one of: a hardware processor, an application specific integrated circuit (ASIC) or a field programmable gate array (FPGA).

An example 45 concerning the method of any one of examples 12-20, wherein the determining determines the power-affecting operational setting based on plural differing types of operating conditions of the device, the plural differing types of operating conditions being obtained simultaneously during a same operating condition collecting session, and each being an operating condition of the device when communicatively coupled to the another device.

An example 46 concerning the method of any one of examples 12-20, wherein the determining determines the power-affecting operational setting based on plural differing types of operating conditions of the device, the plural differing types of operating conditions being obtained in parallel during a same operating condition collecting session, and each being an operating condition of the device when communicatively coupled to the another device.

An example 47 concerning the method of any one of examples 12-20 and 45-46, wherein the device is communicatively coupled to the another device via one of: WiFi, WiGig, IEEE 802.11a/g, IEEE 802.11ac or IEEE 802.11ad.

An example 48 concerning the method of any one of examples 12-20 and 45-47, wherein the device is one of: user equipment, a computer, a personal computer (PC), a desktop computer, a laptop computer, an ultrabook computer, a smartphone, a tablet computer, a notebook computer, a netbook computer, a tablet, a smart phone, embedded electronics, a gaming console, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof.

An example 49 concerning the method of any one of examples 12-20 and 45-48, wherein the circuitry is at least one of: a hardware processor, an application specific integrated circuit (ASIC) or a field programmable gate array (FPGA).

An example 50 concerning the medium of any one of examples 21-29, wherein the determining determines the power-affecting operational setting based on plural differing types of operating conditions of the device, the plural differing types of operating conditions being obtained simultaneously during a same operating condition collecting session, and each being an operating condition of the device when communicatively coupled to the another device.

An example 51 concerning the medium of any one of examples 21-29, wherein the determining determines the power-affecting operational setting based on plural differing types of operating conditions of the device, the plural differing types of operating conditions being obtained in parallel during a same operating condition collecting session, and each being an operating condition of the device when communicatively coupled to the another device.

An example 52 concerning the medium of any one of examples 21-29 and 50-51, wherein the device is communicatively coupled to the another device via one of: WiFi, WiGig, IEEE 802.11a/g, IEEE 802.11ac or IEEE 802.11ad.

An example 53 concerning the medium of any one of examples 21-29 and 50-52, wherein the device is one of: user equipment, a computer, a personal computer (PC), a desktop computer, a laptop computer, an ultrabook computer, a smartphone, a tablet computer, a notebook computer, a netbook computer, a tablet, a smart phone, embedded electronics, a gaming console, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof.

An example 54 concerning the medium of any one of examples 21-29 and 50-53, wherein the circuitry is at least one of: a hardware processor, an application specific integrated circuit (ASIC) or a field programmable gate array (FPGA).

An example 55 concerning the chipset of any one of examples 30-39, wherein the scenario analyzer to determine the power-affecting operational setting based on plural differing types of operating conditions of the device, the plural differing types of operating conditions being obtained simultaneously during a same operating condition collecting session, and each being an operating condition of the device when communicatively coupled to the another device.

An example 56 concerning the chipset of any one of examples 30-39, wherein the scenario analyzer to determine the power-affecting operational setting based on plural differing types of operating conditions of the device, the plural differing types of operating conditions being obtained in parallel during a same operating condition collecting session, and each being an operating condition of the device when communicatively coupled to the another device.

An example 57 concerning the chipset of any one of examples 30-39 and 55-56, wherein the device is communicatively coupled to the another device via one of: WiFi, WiGig, IEEE 802.11a/g, IEEE 802.11ac or IEEE 802.11ad.

An example 58 concerning the chipset of any one of examples 30-39 and 55-57, wherein the apparatus is one of: user equipment, a computer, a personal computer (PC), a desktop computer, a laptop computer, an ultrabook computer, a smartphone, a tablet computer, a notebook computer, a netbook computer, a tablet, a smart phone, embedded electronics, a gaming console, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof.

The example 59 concerning the chipset of any one of examples 30-39 and 55-58, wherein the circuitry is at least one of: a hardware processor, an application specific integrated circuit (ASIC) or a field programmable gate array (FPGA).

What is claimed is:

1. An apparatus comprising:
   circuitry;
   a scenario analyzer for execution by the circuitry, the scenario analyzer to determine a power-affecting operational setting based on at least one operating condition of a device, the at least one operating condition of the device to comprise an operating condition of the device when communicatively coupled to another device, and the at least one operating condition of the device to include universal serial bus (USB) related information; and
   an operational setting module for execution by the circuitry, the operational setting module to set a first operational setting of the device based on the determined power-affecting operational setting.

2. The apparatus of claim 1, comprising:
   at least one collector module for execution by the circuitry, the at least one collector module to dynamically collect the at least one operating condition of the device when communicatively coupled to the another device, and to provide the at least one operating condition to the scenario analyzer.

3. The apparatus of claim 1, comprising:
   at least one analyzer module for execution by the circuitry, to dynamically collect and analyze the at least one operating condition of the device when communicatively coupled to the another device, and to provide an analysis result of the at least one operating condition to the scenario analyzer.

4. The apparatus of claim 1, wherein the scenario analyzer is to determine the power-affecting operational setting based on plural operating conditions of the device, the plural operating conditions of the device to each be an operating condition of the device when communicatively coupled to the another device.

5. The apparatus of claim 1, wherein the scenario analyzer is to determine the power-affecting operational setting based on plural differing types of operating conditions of the device, the plural differing types of operating conditions of the device to each be an operating condition of the device when communicatively coupled to the another device.

6. The apparatus of claim 5, comprising:
plural operating collector modules, for execution by the circuitry, the plural operating collector modules to dynamically collect the plural differing types of operating conditions, respectively, when communicatively coupled to the another device, and to provide the plural differing types of operating conditions to the scenario analyzer.

7. The apparatus of claim 5, comprising:
plural analyzer modules, for execution by the circuitry, the plural analyzer modules to dynamically collect and analyze the plural differing types of operating conditions, respectively, when communicatively coupled to the another device, and to provide analysis results of the plural differing types of operating conditions to the scenario analyzer.

8. The apparatus of claim 1, wherein the scenario analyzer is to determine the power-affecting operational setting based on plural differing types of operating conditions of the device, the plural differing types of operating conditions being obtained concurrently during a same operating condition collecting session, and each being an operating condition of the device when communicatively coupled to the another device.

9. The apparatus of claim 8, wherein the plural differing types of operating conditions are ones selected from a list of types including: platform state information; Universal Serial Bus (USB) state information; video state information; user preference state information; and Internet Protocol (IP) data path state information.

10. The apparatus of claim 1, comprising the circuitry being provided via a chipset within the device, the chipset to enable the device to wirelessly couple or dock to another device.

11. The apparatus of claim 10, comprising the chipset to operate in compliance with at least one or more wireless communication standards associated with the Institute of Electrical and Electronic Engineers (IEEE) 802.11 standards to include IEEE 802.11ad, the chipset further implementing the scenario analyzer.

12. A computer-implemented scenario analysis method for an apparatus, comprising:
determining a power-affecting operational setting based on at least one operating condition of a device, the at least one operating condition of the device to comprise an operating condition of the device when communicatively coupled to another device, and the at least one operating condition of the device to include universal serial bus (USB) related information; and
setting a first operational setting of the device based on the determined power-affecting operational setting.

13. The method of claim 12, comprising:
dynamically collecting the at least one operating condition of the device via at least one collector module, when communicatively coupled to the another device, and providing the at least one operating condition to the determining operation.

14. The method of claim 12, comprising:
dynamically collecting and analyzing the at least one operating condition of the device via at least one analyzer module, when communicatively coupled to the another device, and to provide an analysis result of the at least one operating condition to the determining operation.

15. The method of claim 12, wherein the determining more specifically determines the power-affecting operational setting based on plural operating conditions of the device, the plural operating conditions of the device to each be an operating condition of the device when communicatively coupled to the another device.

16. The method of claim 12, wherein the determining more specifically determines the power-affecting operational setting based on plural differing types of operating conditions of the device, the plural differing types of operating conditions of the device to each be an operating condition of the device when communicatively coupled to the another device.

17. The method of claim 16, comprising:
dynamically collecting the plural differing types of operating conditions via plural operating collector modules, respectively, when communicatively coupled to the another device, and to provide the plural differing types of operating conditions to the determining operation; and
analyzing the plural differing types of operating conditions via plural analyzer modules, respectively, when communicatively coupled to the another device, and to provide analysis results of the plural differing types of operating conditions to the determining operation.

18. The method of claim 12, wherein the determining determines the power-affecting operational setting based on plural differing types of operating conditions of the device, the plural differing types of operating conditions being obtained concurrently during a same operating condition collecting session, and each being an operating condition of the device when communicatively coupled to the another device, and wherein the plural differing types of operating conditions are ones selected from a list of types including: platform state information; Universal Serial Bus (USB) state information; video state information; user preference state information; and Internet Protocol (IP) data path state information.

19. At least one non-transitory machine readable medium comprising a plurality of instructions that in response to being executed on a system maintained at an apparatus cause the system to implement a scenario analysis to:
determine a power-affecting operational setting based on at least one operating condition of a device, the at least one operating condition of the device to comprise an operating condition of the device when communicatively coupled to another device, and the at least one operating condition of the device to include universal serial bus (USB) related information; and
set a first operational setting of the device based on the determined power-affecting operational setting.

20. The medium of claim 19, comprising the instructions to also cause the system to:
dynamically collect the at least one operating condition of the device via at least one collector module, when communicatively coupled to the another device, and providing the at least one operating condition to the determine operation.

21. The medium of claim 19, comprising the instructions to also cause the system to:
dynamically collect and analyze the at least one operating condition of the device via at least one analyzer module, when communicatively coupled to the another device, and to provide an analysis result of the at least one operating condition to the determine operation.

22. The medium of claim 19, wherein the determine operation determines the power-affecting operational setting based on plural differing types of operating conditions of the device, the plural differing types of operating conditions being obtained concurrently during a same operating condition collecting session, and each being an operating condition of the device when communicatively coupled to the another device, and wherein the plural differing types of operating conditions are ones selected from a list of types including: platform state information; Universal Serial Bus (USB) state information; video state information; user preference state information; and Internet Protocol (IP) data path state information.

23. A chipset comprising:
  circuitry;
  a scenario analyzer for execution by the circuitry, the scenario analyzer to determine a power-affecting operational setting based on at least one operating condition of a device, the at least one operating condition of the device to comprise an operating condition of the device when communicatively coupled to another device, and the at least one operating condition of the device to include universal serial bus (USB) related information; and
  an operational setting module for execution by the circuitry, the operational setting module to set a first operational setting of the device based on the determined power-affecting operational setting.

24. The chipset of claim 23, comprising:
  at least one collector module for execution by the circuitry, the at least one collector module to dynamically collect the at least one operating condition of the device when communicatively coupled to the another device, and to provide the at least one operating condition to the scenario analyzer.

25. The chipset of claim 23, comprising:
  at least one analyzer module for execution by the circuitry, the at least one analyzer module to dynamically collect and analyze the at least one operating condition of the device when communicatively coupled to the another device, and to provide an analysis result of the at least one operating condition to the scenario analyzer.

* * * * *